US008874460B2

(12) United States Patent
Hahn et al.

(10) Patent No.: US 8,874,460 B2
(45) Date of Patent: Oct. 28, 2014

(54) HEALTHCARE MARKETING DATA OPTIMIZATION SYSTEM AND METHOD

(75) Inventors: Christopher Hahn, Bellevue, WA (US); Derek Slager, Issaquah, WA (US); Ken Harris, Seattle, WA (US)

(73) Assignee: Appature, Inc., Seattle, WA (US)

( * ) Notice: Subject to any disclaimer, the term of this patent is extended or adjusted under 35 U.S.C. 154(b) by 174 days.

(21) Appl. No.: 13/158,264

(22) Filed: Jun. 10, 2011

(65) Prior Publication Data

US 2011/0238488 A1   Sep. 29, 2011

Related U.S. Application Data

(63) Continuation-in-part of application No. 12/689,988, filed on Jan. 19, 2010, now Pat. No. 8,244,573.

(60) Provisional application No. 61/145,647, filed on Jan. 19, 2009.

(51) Int. Cl.
G06Q 10/00 (2012.01)

(52) U.S. Cl.
USPC ........ 705/7.32; 705/7.29; 705/7.36; 705/7.38

(58) Field of Classification Search
None
See application file for complete search history.

(56) References Cited

U.S. PATENT DOCUMENTS

| | | | |
|---|---|---|---|
| 5,721,831 A | 2/1998 | Waits et al. | |
| 6,071,112 A | 6/2000 | Calvin et al. | |
| 6,073,112 A | 6/2000 | Geerlings | |
| 6,339,795 B1 | 1/2002 | Narurkar et al. | |
| 6,904,409 B1 | 6/2005 | Lambert et al. | |
| 7,660,413 B2 | 2/2010 | Partovi et al. | |
| 7,996,373 B1 | 8/2011 | Zoppas et al. | |
| 8,255,370 B1 | 8/2012 | Zoppas et al. | |
| 2004/0103017 A1 | 5/2004 | Reed et al. | |
| 2004/0107386 A1* | 6/2004 | Burdick et al. | 714/38 |
| 2004/0138958 A1 | 7/2004 | Watarai et al. | |
| 2005/0010477 A1 | 1/2005 | Sullivan et al. | |
| 2005/0131752 A1 | 6/2005 | Gracie et al. | |
| 2005/0159996 A1 | 7/2005 | Lazarus et al. | |
| 2005/0216313 A1 | 9/2005 | Claud et al. | |
| 2005/0261951 A1 | 11/2005 | Tighe | |
| 2006/0206505 A1* | 9/2006 | Hyder et al. | 707/100 |
| 2007/0033174 A1 | 2/2007 | Cornacchia et al. | |
| 2007/0043761 A1 | 2/2007 | Chim et al. | |
| 2007/0211056 A1 | 9/2007 | Chakraborty et al. | |
| 2008/0027995 A1 | 1/2008 | Beigel | |
| 2008/0215622 A1 | 9/2008 | Jordan et al. | |
| 2009/0150213 A1 | 6/2009 | Cyr et al. | |
| 2009/0177540 A1 | 7/2009 | Quatse | |
| 2009/0187461 A1 | 7/2009 | Brignull et al. | |

(Continued)

OTHER PUBLICATIONS

Christen and Gosier, Quality and Complexity Measures for Data Linkage and Deduplication, 2007, p. 1-24.*

(Continued)

*Primary Examiner* — David Rines
(74) *Attorney, Agent, or Firm* — Fish & Richardson P.C.

(57) ABSTRACT

Healthcare marketing data may be cleaned and normalized according to data validity and/or data canonicity rules prior to being merged into a healthcare marketing database. The merging process may include a fuzzy de-duplication operation utilizing a configurable field scoring table for automatically identifying matching and non-matching records. Potential duplicates that cannot be automatically resolved may be provided to an operator to provide merge or no-merge instructions.

12 Claims, 10 Drawing Sheets

(56) References Cited

U.S. PATENT DOCUMENTS

| | | |
|---|---|---|
| 2009/0240558 A1 | 9/2009 | Bandy et al. |
| 2010/0094758 A1 | 4/2010 | Chamberlain et al. |
| 2011/0231227 A1 | 9/2011 | Temares et al. |
| 2011/0231410 A1 | 9/2011 | Hahn et al. |
| 2012/0232957 A1 | 9/2012 | Hahn et al. |

OTHER PUBLICATIONS

"Microsoft Office Excel 2003 Fast & Easy", published 2004, by Diane Koers, pp. 40-49 & 106-115.

* cited by examiner

HEALTHCARE MARKETING DATA OPTIMIZATION SYSTEM AND METHOD

CROSS REFERENCE TO RELATED APPLICATIONS

This application is continuation in part of U.S. application Ser. No. 12/689,988, filed Jan. 19, 2010, titled "DATABASE MARKETING SYSTEM AND METHOD," and naming the following inventors: Christopher Hahn, Kabir Shahani, and Derek Slager. U.S. application Ser. No. 12/689,988 claims the benefit of priority to U.S. Provisional Application No. 61/145,647, filed Jan. 19, 2009, titled "DATABASE MARKETING SYSTEM AND METHOD,", and naming the following inventors: Christopher Hahn, Kabir Shahani, and Derek Slager. The above-cited applications are incorporated herein by reference in their entireties, for all purposes.

FIELD

The present disclosure relates to database marketing, and more particularly to computer-managed healthcare database marketing.

BACKGROUND

Marketers in the healthcare field (as well as other marketing fields) commonly use databases of customers or potential customers (also referred to as "leads") to generate personalized communications to promote a product or service. The method of communication can be any addressable medium, e.g., direct mail, e-mail, telemarketing, and the like.

A marketing database may combine of disparate sources of customer, lead, and/or prospect information so that marketing professionals may act on that information. In some cases, a marketing database may be included in and/or managed using an enterprise marketing management software suite.

Commonly, trade shows, trade fairs, trade exhibitions, "expos," or other like industry-related exhibitions (collectively referred to herein as "trade shows") may be a source of customer, lead, and/or prospect information. Additionally, third-party data providers may supply marketing-related information about doctors, pharmacists, healthcare facilities, prescriptions, procedures, and the like.

However, in many cases, such healthcare-marketing records may include errors or other invalid pieces of data that should be removed and/or corrected before inserting the data into a healthcare marketing database. Moreover, data obtained for input into a healthcare marketing database may be inconsistent in the way the same concept is represented from one record to another. For example, the professional designation "Doctor of Medicine" may be represented in different records as "Doctor of Medicine," "M.D.," "MD," or other like variations. Such inconsistencies can make it difficult to identify and resolve duplicate records in the healthcare marketing database.

DESCRIPTION

Figure 1:
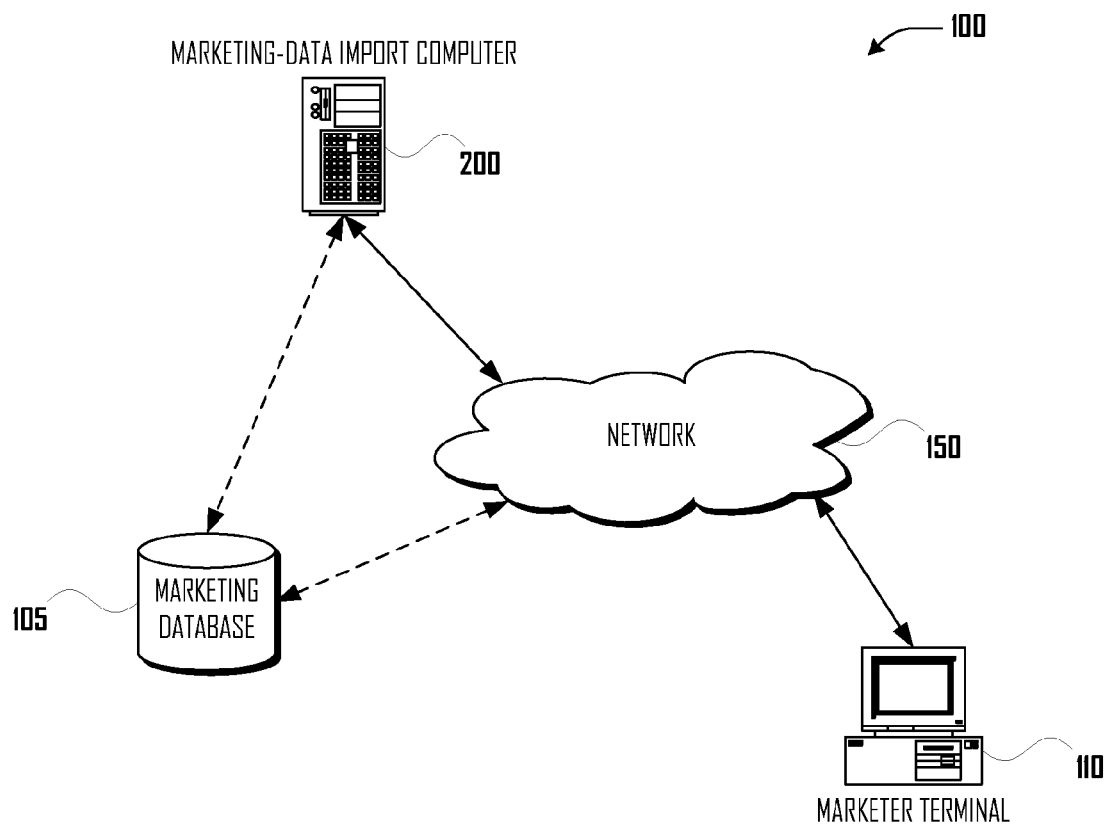
FIG. 1 is a network diagram in accordance with one embodiment.

The detailed description that follows is represented largely in terms of processes and symbolic representations of operations by conventional computer components, including a processor, memory storage devices for the processor, connected display devices, and input devices. Furthermore, these processes and operations may utilize conventional computer components in a heterogeneous distributed computing environment, including remote file Servers, computer Servers, and memory storage devices. Each of these conventional distributed computing components is accessible by the processor via a communication network.

The phrases "in one embodiment," "in various embodiments," "in some embodiments," and the like are used repeatedly. Such phrases do not necessarily refer to the same embodiment. The terms "comprising," "having," and "including" are synonymous, unless the context dictates otherwise.

Reference is now made in detail to the description of the embodiments as illustrated in the drawings. While embodiments are described in connection with the drawings and related descriptions, there is no intent to limit the scope to the embodiments disclosed herein. On the contrary, the intent is to cover all alternatives, modifications, and equivalents. In alternate embodiments, additional devices, or combinations of illustrated devices, may be added to, or combined, without limiting the scope to the embodiments disclosed herein.

FIG. 1 illustrates a number of interconnected devices in accordance with one embodiment. Healthcare marketing database 105, healthcare marketer terminal 110, and healthcare marketing-data import computer 200 are connected to network 150. In various embodiments, network 150 comprises communication switching, routing, and/or data storage capabilities. In various embodiments, network 150 may comprise some or all of the Internet, one or more intranets, and wired and/or wireless network portions. In various embodiments, there may be more than one marketing database 105, and/or marketer terminal 110. Moreover, while FIG. 1 shows a single marketing-data import computer 200, in alternative embodiments, the functions, processes, and routines performed by marketing-data import computer 200 could be hosted or distributed among two or more different devices.

Many embodiments may use multiple devices to comprise one logical device—for example, when marketing-data import computer 200 and/or marketing database 105 are executed or hosted in a "cloud computing" environment.

Alternatively, in some embodiments, two or more of marketing-data import computer 200, marketer terminal 110, and/or marketing database 105 may be hosted on a single physical computing device. For example, in some embodiments, marketing database 105 may be a process executing on marketing-data import computer 200.

Marketer terminal 110 may be any device that is capable of communicating with marketing-data import computer 200, including desktop computers, laptop computers, mobile phones and other mobile devices, PDAs, set-top boxes, and the like.

In various embodiments, marketing database 105 may include a set of records representing, e.g., current customers, prospective leads, contacts, accounts, facilities, and the like. Some such types of records (e.g., leads, contacts) may typically represent individual persons. Other such types (e.g. accounts, facilities) may typically represent entities such as associations, hospitals and other healthcare facilities, organizations, businesses, and the like. Some record types (e.g., customers) may typically represent both individual persons and entities. In many cases, records from differing record types may be associated with one another in various ways. For example, an entity-type record (e.g., a facility-type record representing "City Hospital" or an association-type record representing the American Medical Association) may be at least implicitly associated with numerous contact- and/or lead-type records (e.g., records representing doctors, administrators, and other employees of City Hospital or doctors and other members of the American Medical Association).

The data populating marketing database 105 may have come from various sources, including mailing lists, product registrations, public databases, membership lists, trade shows, sales automation systems (e.g., those provided by Salesforce.com of San Francisco, Calif.), and the like. In many embodiments, as discussed further below, marketing database 105 may be updated on an ongoing and/or periodic basis.

Figure 2:
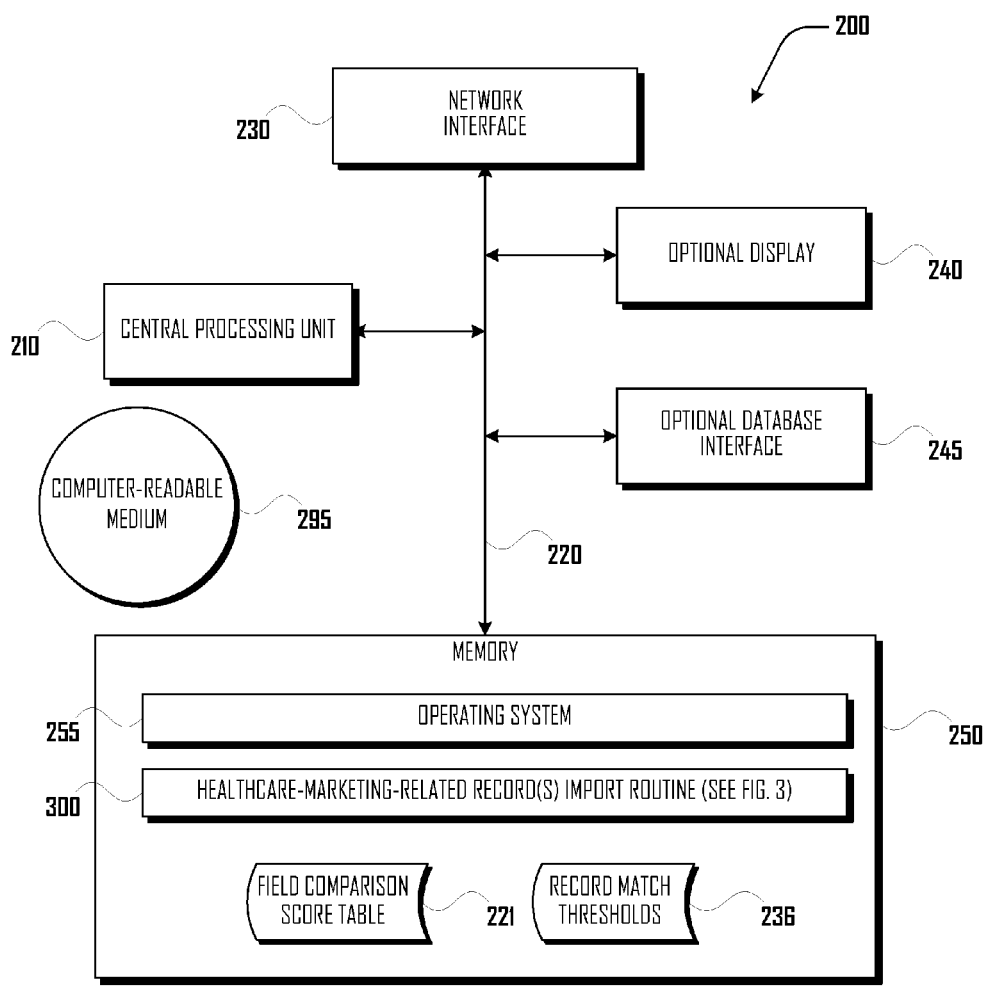
FIG. 2 illustrates one embodiment of a marketing-data import computer.

FIG. 2 illustrates an exemplary marketing-data import computer 200. The example system of FIG. 2 depicts a number of subsystems, modules, routines, and engines, some or all of which may by employed in a particular embodiment; the systems, modules, routines, and engines are not, however, limited to those illustrated. Other embodiments could be practiced in any number of logical software and physical hardware components and modules. The modules and components are listed herein merely for example.

Marketing-data import computer 200 includes a processing unit 210, a memory 225, and an optional display 240, all interconnected, along with network interface 230, via bus 220. Memory 250 generally comprises a random access memory ("RAM"), a read only memory ("ROM"), and/or a permanent mass storage device, such as a disk drive. In some embodiments, memory 250 may also comprise a local and/or remote database, database server, and/or database service (e.g., marketing database 105). In other embodiments, network interface 230 and/or other database interface (not shown) may be used to communicate with a database (e.g., marketing database 105). Memory 250 stores program code and/or data for some or all of a healthcare-marketing-related record(s) import routine 300 (see FIG. 3, discussed below), a field comparison score table 221, and a set of record match thresholds 236. In addition, memory 250 also stores an operating system 255.

These and other software components may be loaded from a computer readable storage medium 295 into memory 250 of marketing-data import computer 200 using a drive mechanism (not shown) associated with a non-transient, tangible, computer readable storage medium 295, such as a floppy disc, tape, DVD/CD-ROM drive, memory card. In some embodiments, software components may also be loaded via the network interface 230 or other non-storage media.

Figure 3:
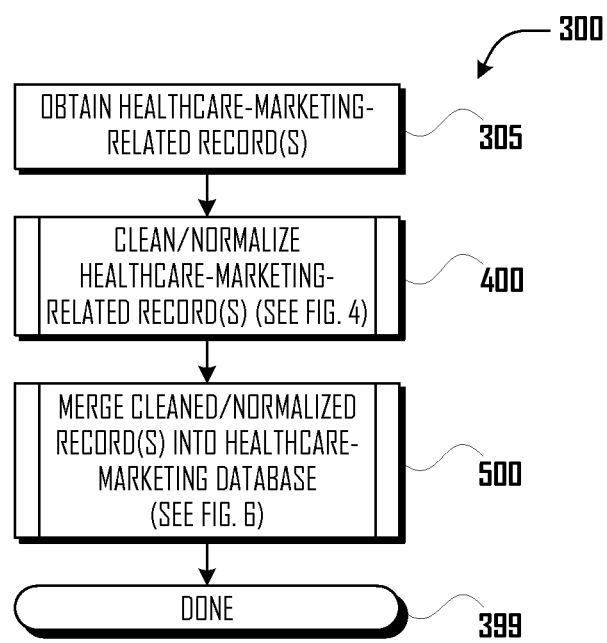
FIG. 3 illustrates a routine for importing one or more records related to healthcare marketing into a healthcare marketing database, in accordance with one embodiment

FIG. 3 illustrates a routine 300 for importing one or more records related to healthcare marketing into a healthcare marketing database, in accordance with one embodiment. In block 305, routine 300 obtains one or more healthcare marketing related records. For example, in various embodiments, the one or more healthcare marketing related records may be obtained from various sources including mailing lists, project registrations, public databases, membership lists, trade shows, and the like. In other embodiments, routine 300 may obtain healthcare marketing data from a third party healthcare marketing data provider such as IMS Health Incorporated of Norwalk, Conn.; Healthcare Management Systems Incorporated of Nashville, Tenn.; SDI Health, LLC of Plymouth Meeting, Pa.; or the like. In other embodiments, healthcare marketing data may be obtained from pharmacies, government sources, professional organizations, and the like.

In many cases, the records obtained in block 305 may include errors or other invalid data arising from input entry errors, typographical errors, data corruption and the like. Moreover, even when a record contains valid data there may be many different ways to represent the same piece of information. For example, there are many different valid ways to represent a phone number, an address, and other like data.

Accordingly, in subroutine block 400 (see FIG. 4, discussed below), routine 300 cleans and normalizes the records related to healthcare marketing that were obtained in block 305. In one embodiment, subroutine 400 ensures that data included in the records related to healthcare marketing is valid and represented in a consistent or canonical manner as appropriate.

In subroutine block 500 (see FIG. 5, discussed below) routine 300 merges the cleaned and normalized records into a healthcare marketing database, such as database 105. Routine 300 ends in block 399.

Figure 4:
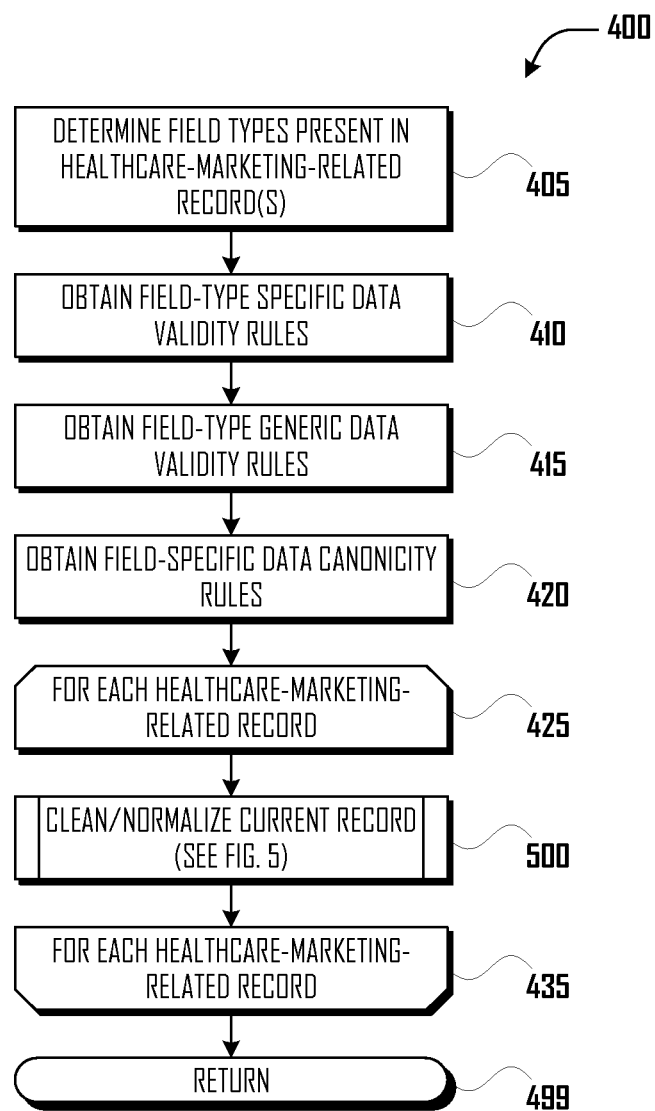
FIG. 4 illustrates a subroutine for cleaning and normalizing records related to healthcare marketing, in accordance with one embodiment.

FIG. 4 illustrates a subroutine 400 for cleaning and normalizing records related to healthcare marketing, in accordance with one embodiment. In block 405, subroutine 400 determines one or more field types present in the healthcare marketing related records. For example, in one embodiment, the records may include data fields such as some or all of the following:

First Name;
Last Name;
Email Address;
Company;
Title;
City;
State;
Zip Code, Postal Code, or the like;
Address Line 1;
Address Line 2;
Country;
Role (e.g., Point of Care Coordinator, Nurse, Diabetes Educator, and the like);
Professional Designation (e.g., MD, PhD, MD/PhD, DO, and the like);
and the like.

In block 410, subroutine 400 obtains one or more data validity rules specific to one or more of the field types determined in block 405. For example, in some embodiments, for fields of a type that should contain only numeric data, such as United States zip codes, phone numbers, and the like, subroutine 400 may obtain a rule indicating that non-numeric data is invalid and should be removed from the field data. For another example, in some embodiments, for first name fields, last name fields, and the like, subroutine 400 may obtain a data validity rule indicating that some or all non-alphabetic data is invalid and should be removed from the field. For yet another example, in some embodiments, subroutine 400 may obtain a rule comprising a domain specific dictionary. For example, for a field type such as State, subroutine 400 may obtain a rule comprising a dictionary including some or all United States, territories, and/or possessions.

In block 415, subroutine 400 obtains one or more "generic" data validity rules that may be applicable to fields that do not have a specific data validity rule. For example, in one embodiment, subroutine 400 may obtain a rule indicating that one or more non-alphanumeric characters are to be considered invalid and should be removed from a field.

In block 420, subroutine 400 obtains one or more data canonicity rules specific to one or more of the field types determined in block 405. For example, in one embodiment, subroutine 400 may obtain a data canonicity rule for a phone number type field, the rule indicating a canonical form in which phone numbers are to be stored (e.g., ###-###-####). For another example, in some embodiments, subroutine 400 may obtain a rule indicating a canonical form for Addresses (e.g., United States Postal Service standardized address form), professional designations (e.g., "MD," "PhD," "MD/PhD," "DO," and the like; or alternately, "M.D.," "Ph.D.," "M.D./Ph.D.," "D.O.," and the like), or other standardizable field type. In some embodiments, data canonicity rules may be based on or otherwise derived from industry truth data sources.

Beginning in opening loop block 425, subroutine 400 processes each of the records related to healthcare marketing obtained in block 405. In subroutine block 500 (see FIG. 5 discussed below), subroutine 400 cleans and normalizes the current record according to the rules obtained in blocks 410, 415, and 420. In closing loop block 435, subroutine 400 iterates back to block 425 to process the next record (if any). Once all records related to healthcare marketing have been processed, subroutine 400 ends in block 499.

Figure 5:
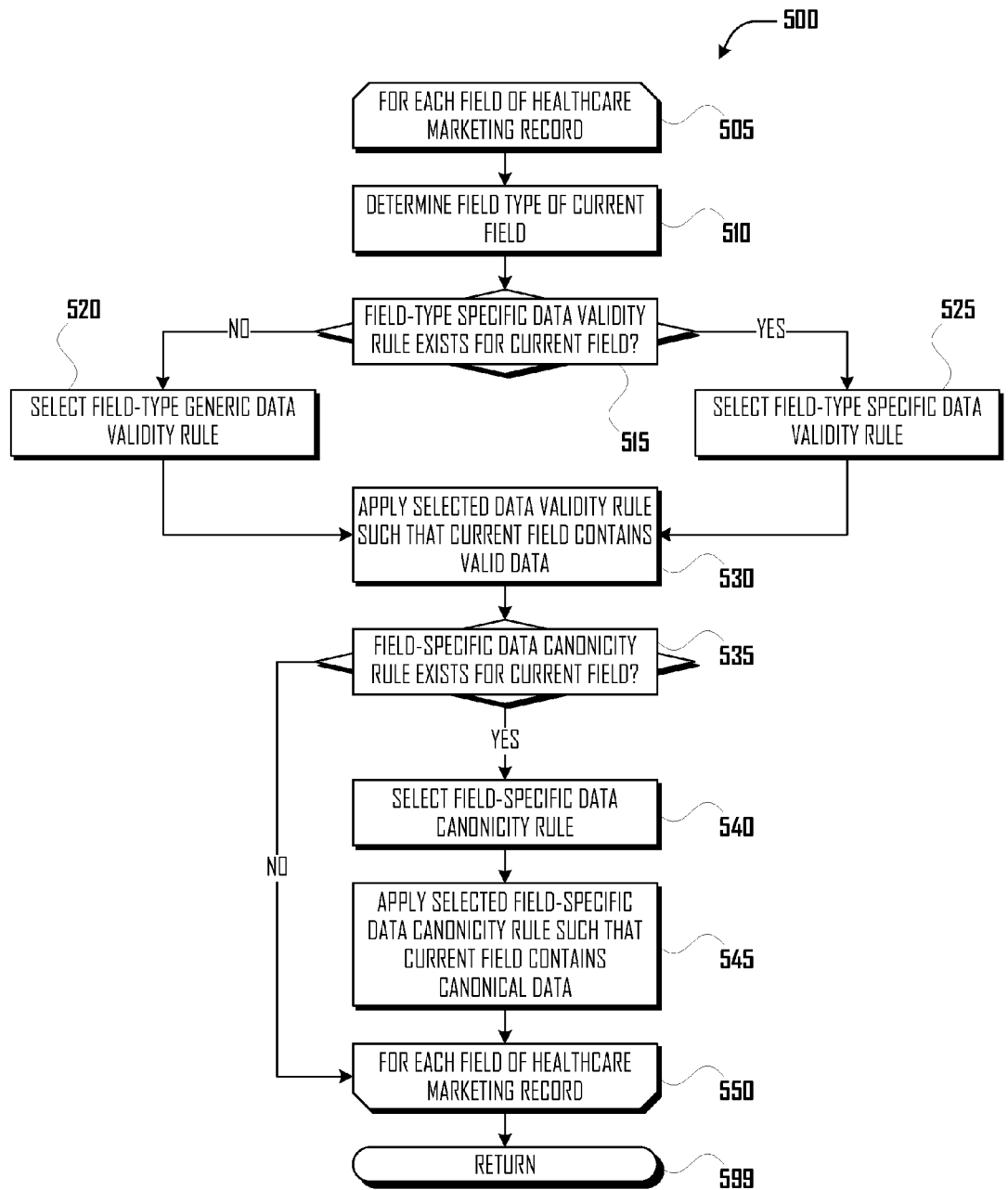
FIG. 5 illustrates a subroutine for cleaning and normalizing a record related to healthcare marketing, in accordance with one embodiment.

FIG. 5 illustrates a subroutine 500 for cleaning and normalizing a record related to healthcare marketing, in accordance with one embodiment. Beginning in opening loop block 505, subroutine 500 processes each field of the healthcare marketing record.

In block 510, subroutine 500 determines a field type of the current field. For example, in one embodiment, subroutine 500 may determine that the current field is of a first name type, a last name type, an e-mail type, a company type, or the like.

In decision block 515, subroutine 500 determines whether there exists a data validity rule that is specific to the field type determined in block 510. If so, then in block 525, subroutine 500 selects the field-type-specific data validity rule. Otherwise, in block 520, subroutine 500 selects a "generic" data validity rules that may be generally applicable to several types of field.

In some embodiments, a data validity rule may include pattern-matching logic, such as a regular expression, wildcard expression, glob pattern, or the like. In some embodiments, a data validity rule may further include a substitution pattern, deletion instruction, or other instruction for processing patterns matched by the data validity rule. For example, in one embodiment, a data validity rule that may be applied to a phone number or zip code field may include a pattern for matching non-digit characters (e.g., [^0-9]) and an instruction to strip or delete matching non-digit characters.

In block 530, subroutine 500 applies the selected data validity rule, modifying the current field (if need be) such that it contains only valid data. For example, in some embodiments, applying the selected data validity rule may include identifying and removing characters or other field contents that the rule designates as being invalid.

In decision block 535, subroutine 500 determines whether there exists a data canonicity rule that is specific to the current field. If not, then subroutine 500 skips ahead to closing loop block 550, in which subroutine 500 iterates back to block 505 to process the next field (if any) of the healthcare marketing record.

Otherwise, if subroutine 500 determines that a specific data canonicity rule exists for the current field, then in block 540, subroutine 500 selects the field-specific data canonicity rule. In block 545, subroutine 500 applies the selected field-specific data canonicity rule such that the current field contains canonical data. When a given field contains canonical data across all records in a database, then a given concept (e.g., "Doctor of Medicine" or "the 21st floor of 1218 3rd Avenue") will be represented consistently (e.g., "MD" or "1218 3RD AVE STE 2100") in that field in all records, which consistency may facilitate data merging and/or de-duplication activities, such as are described in FIG. 6, discussed below.

In closing loop block 550, subroutine 500 iterates back to block 505 to process the next field of the record related to healthcare marketing (if any). Once all fields of the record have been processed, subroutine 500 ends in block 599.

Figure 6:
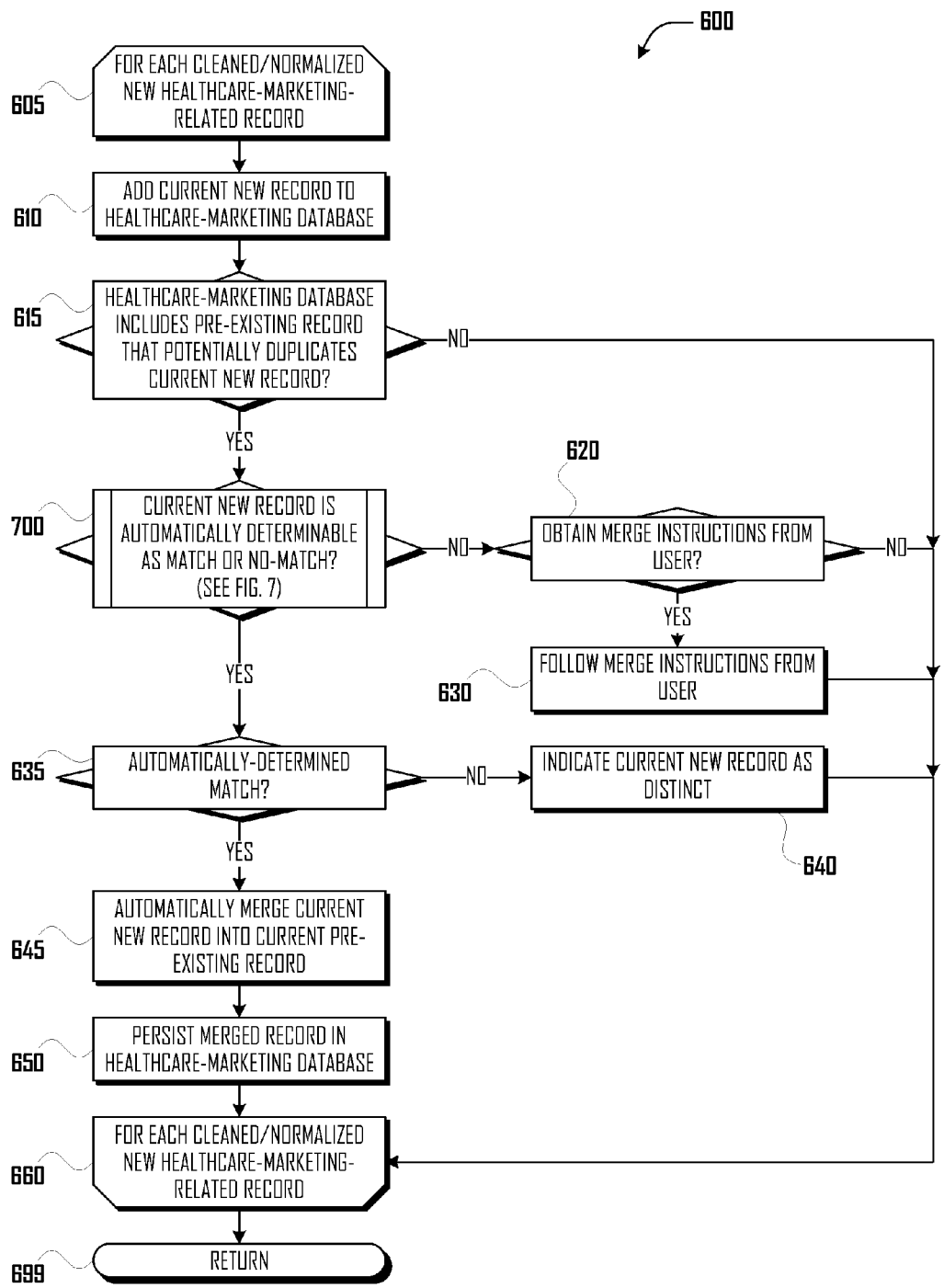
FIG. 6 illustrates a subroutine for merging cleaned and normalized records into a healthcare marketing database, in accordance with one embodiment.

FIG. 6 illustrates a subroutine 600, in accordance with one embodiment, for merging a plurality of cleaned and normalized new records into a healthcare marketing database containing a plurality of preexisting records. Beginning in opening loop block 605, subroutine 600 processes each cleaned and normalized new record in turn.

In block 610, subroutine 600 adds the current new record to the healthcare marketing database. In decision block 615, subroutine 600 determines whether the healthcare marketing database includes a preexisting record that at least partially matches (and therefore potentially duplicates) the current new record.

For example, in one embodiment, subroutine 600 may compare some or all of one or more representative fields of the current new record (e.g., First Name, Last Name Email Address, Company, and the like) to corresponding fields in preexisting records in the healthcare marketing database to identify zero or more preexisting records whose corresponding fields have at least partially similar values.

In one embodiment, the comparison includes determining an edit distance (e.g., the Levenshtein distance) between one or more fields of the pair of records being compared. (An "edit distance" represents the number of edits required to convert one string to another string.) For example, in one embodiment, a Levenshtein distance of 1 may be determined between a First Name element of record 1 (e.g., "Steven") and the same element of record 2 (e.g., "Steve").

In one embodiment, an edit distance value below a threshold may result in the preexisting record being identified as a partial match (potential duplicate) of the current new record, the identified record being retained for more extensive processing. In one embodiment, this partial-match threshold may be 4. This and other exemplary thresholds disclosed herein were determined based on data from trade show participants in the medial equipment and supply industry, as well as industry truth sources (e.g., data from IMS Health Incorporated of Norwalk Conn., Health Market Science of King of Prussia, Pa., and the like), and other third-party data sources. In other embodiments, other threshold values may be more appropriate. Conversely, any edit distance value above the threshold may result in the records being treated as non-matching (so no further de-duplication and/or merging operations may be performed).

If more than one partially matching preexisting record is identified, subroutine 600 may select the partially matching record that most closely matches the current new record (e.g., the partially matching record having the lowest individual or aggregate edit distance compared to representative fields of the current new record).

If, in block 615, subroutine 600 determines that the healthcare marketing database includes a preexisting record that at least partially matches (and therefore potentially duplicates) the current new record, then in decision subroutine block 700 (see FIG. 7, discussed below) subroutine 600 determines whether the newly added record can be automatically determined as either a match or a no-match compared to the potentially duplicate preexisting record. If not, then in decision block 620, subroutine 600 determines whether to obtain instructions from a user for the current pair of records. For example, in one embodiment, record pairs that are almost similar enough to be automatically-determinable matches may be presented to the user to provide merge or no-merge instructions in block 630. (For example, see FIGS. 9 and 10, discussed below. See also Record Match Thresholds Table 2 and Not-automatically-determinable Sub-Thresholds Table 3, below.) Conversely, in one embodiment, record pairs that are almost dissimilar enough to be automatically-determinable no-matches may be subject to no further processing.

Otherwise, if the current new record can be automatically determined to be a match or a no-match compared to the preexisting record, then in decision block 635, subroutine 600 determines whether the current new record was automatically determined to be a match of the preexisting record. If not (i.e., the record was automatically determined to be a no-match), then in block 640, subroutine 600 indicates the current new record as being distinct from the identified preexisting record.

Otherwise, if the new record was automatically determined to be a match, then in block 645, subroutine 600 automatically merges the current new record into the preexisting record. For example, if one record contains a company name and an address, and another record contains a contact name and a company name (but no address information) then the two partially-matching Records 1 and 2 may be automatically merged in a manner similar to the following.

Record 1
First Name="Christopher"
Last Name="Hahn"
Company="Appature"
City=(null)
State="Washington"
Zip Code=(null)
Address Line 1=(null)
Address Line 2=(null)

Record 2
First Name=(null)
Last Name=(null)
Company="Appature Inc."
City="Seattle"
State="WA"
Zip Code="98104"
Address Line 1="730 3rd Avenue"
Address Line 2="23rd Floor"

Consolidated Record
First Name="Christopher"
Last Name="Hahn"
Company="Appature Inc."
City="Seattle"
State="WA"
Zip Code="98104"
Address Line 1="730 3rd Avenue"
Address Line 2="23rd Floor"

In one embodiment, the fields from the partially matching Records 1 and/or 2 may be retained in the history of the consolidated record and flagged with an indicator such as "conversion" or "consolidated." In alternative embodiments, the operator may be prompted when duplicates are found, or alternative methods of consolidation may be employed.

In block 650, subroutine 600 persists the merged record in the healthcare marketing database. In some embodiments, persisting the merged record may include removing the new record added to the database in block 610.

In closing loop block 660, subroutine 600 iterates back to block 605 to process the next cleaned and normalized new record (if any). Once all cleaned and normalized new records have been processed, subroutine 600 ends in block 699.

Figure 7:
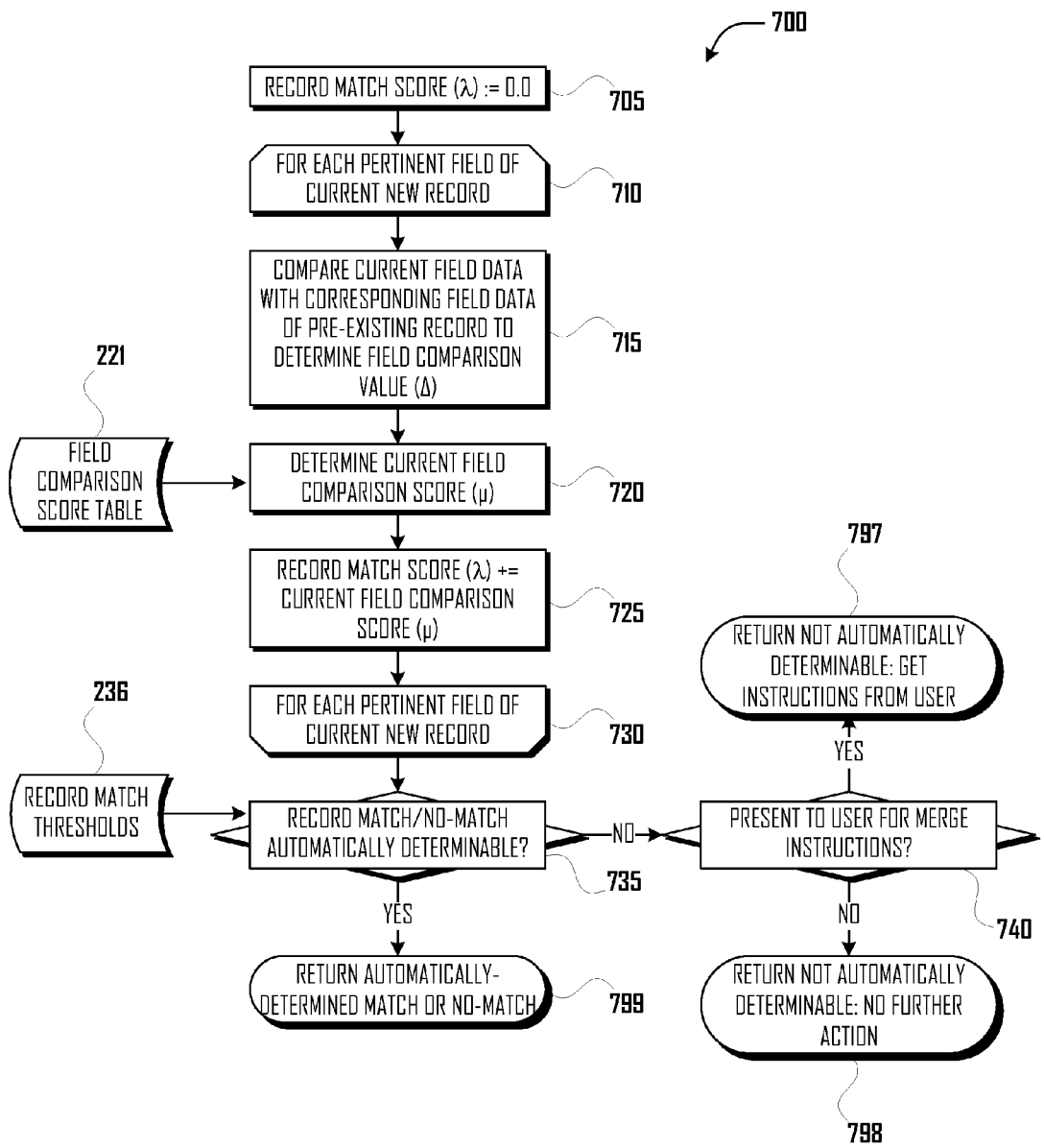
FIG. 7 illustrates a decision subroutine for determining whether a new record can be automatically determined to be a match or a no-match compared to a preexisting record, in accordance with one embodiment.

FIG. 7 illustrates a decision subroutine 700 for determining whether a new record can be automatically determined to be a match or a no-match compared to a preexisting record, in accordance with one embodiment. In block 705, subroutine 700 initializes a record match score ($\lambda$). For example, in one embodiment, subroutine may declare a variable and initialize its value to a starting value, such as zero.

Beginning in opening loop block 710, subroutine 700 processes each field of the new record that is pertinent to identifying potential duplicates. In some embodiments, only certain fields (e.g., those containing identifying information such as names, addresses, contact information, and the like) may be considered pertinent. In some embodiments, every field of the new record may be considered pertinent.

In block 715, subroutine 700 compares the current field data with corresponding field data of the preexisting record to determine a comparison value (Δ) for the current field. For example, in one embodiment, subroutine 700 may determine an edit distance (e.g., a Levenshtein distance) between the current field data of the new record and corresponding field data of the preexisting record. In other embodiments, other distance algorithms may be applied, either on a one-to-one basis or, in other embodiments, a many-to-one or many-to-many configuration.

In block 720, subroutine 700 uses the field comparison value (Δ) and field comparison score table 721 to determine a field comparison score ($\mu$) for the current field. For example, in one embodiment, fields in a record of a type associated with an individual may receive a comparison score according to exemplary Field Comparison Table 1 (below).

| Field Comparison Table 1 | | | |
| --- | --- | --- | --- |
| Field | $\Delta \leq 1$ (Match) | $1 < \Delta < 4$ (Partial match) | $\Delta \geq 4$ (No match) |
| First Name | 1.0 | 0.5 | −1.5 |
| Last Name | 1.0 | 0.5 | −2.5 |
| Email | 2.5 | 0.0 | 0 |
| Company | 0.8 | 0.4 | 0 |
| Title | 0.4 | 0.2 | 0 |
| City | 0.8 | 0.4 | 0 |
| State | 0.8 | 0.4 | 0 |
| Zip Code | 2.0 | 1.0 | 0 |
| Phone | 2.5 | 1.25 | 0 |
| Address Line 1 | 2.0 | 1.0 | 0 |
| Address Line 2 | 1.0 | 0.5 | 0 |

Using the exemplary Field Comparison Table 1, when comparing the 'First Name' fields of two records, subroutine 700 would assign a field comparison score (µ) of 1.0 if the 'First Name' fields were deemed a match (i.e., if field comparison value Δ is less than or equal to a field-match threshold, such as 1); subroutine 700 would assign a field comparison score (µ) of 0.5 if the fields were deemed a "partial" match (i.e., if field comparison value Δ is between a field-match threshold, such as 1, and a field no-match threshold, such as 4); and subroutine 700 would assign a field comparison score (µ) of −1.5 if the fields were deemed not to match (i.e., if field comparison value Δ is greater than or equal to a field-no-match threshold, such as 4).

Similarly, when comparing the 'Email' data elements of two records, subroutine 700 would assign a field comparison score (µ) of 2.5 if the 'Email' fields were deemed a match, µ=0 if the fields were deemed a "partial" match, and µ=0 if the fields were deemed not to match. For other record types and/or record types having different data elements than those illustrated, a different field comparison score table may be used.

In block 725, subroutine 700 accumulates (e.g., via summation or the like) the field comparison score (µ) determined in block 720 into the record match score (λ) initialized in block 705. In closing loop block 730, subroutine 700 iterates back to block 710 to process the next pertinent field of the current new record (if any).

Once all fields of the current new record had been processed, then in decision block 735, subroutine 700 uses one or more predetermined record match thresholds 236 to determine whether the current new record can be automatically determined to be a match or a no-match of the preexisting record. Record Match Thresholds Table 2 (below) illustrates an exemplary set of predetermined record match thresholds that may be employed in accordance with one embodiment.

| Record Match Thresholds Table 2 | | |
| --- | --- | --- |
| λ ≥ 5 | 1 < λ < 5 | λ ≤ 1 |
| automatically-determinable match | not automatically determinable | automatically-determinable no-match |

If in decision block 735, subroutine 700 can automatically determine that the current new record is a match or a no-match, then subroutine 700 ends in block 799, returning to the caller and indicating that the current new record was automatically determined to be a match or a no-match, as appropriate.

Otherwise, if in decision block 735, subroutine 700 cannot automatically determine whether the current new record is a match or a no-match, then in decision block 740, subroutine 700 determines whether the current pair of records should be presented to a user for merge or no-merge instructions. For example, in some embodiments, the category of "not automatically determinable" may be divided into sub-categories as shown in Not-automatically-determinable Sub-Thresholds Table 3 (below). According to the exemplary sub-categories, pairs of records that score towards the top of the not-automatically-determinable range may be flagged for presentation to the user to obtain merge instructions, while those that score towards the bottom of the range may be ignored without seeking input from a user.

| Not-automatically-determinable Sub-Thresholds Table 3 | |
| --- | --- |
| 3 < λ < 5 | 1 < λ < 3 |
| obtain merge instructions from user | take no action |

If in decision block 740, subroutine 700 determines that the current pair of records should be presented to a user for merge or no-merge instructions, then in block 797, subroutine 700 returns to the caller, indicating that a match/no-match was not automatically determinable and that the current pair of records should be presented to a user. Otherwise, subroutine 700 returns in block 798, indicating that a match/no-match was not automatically determinable and that no further action should be taken on the current pair of records. In alternate embodiments, all record pairs that are determined to be in the "not automatically determinable category" may be presented to a user for merge or no-merge instructions.

Figure 8:
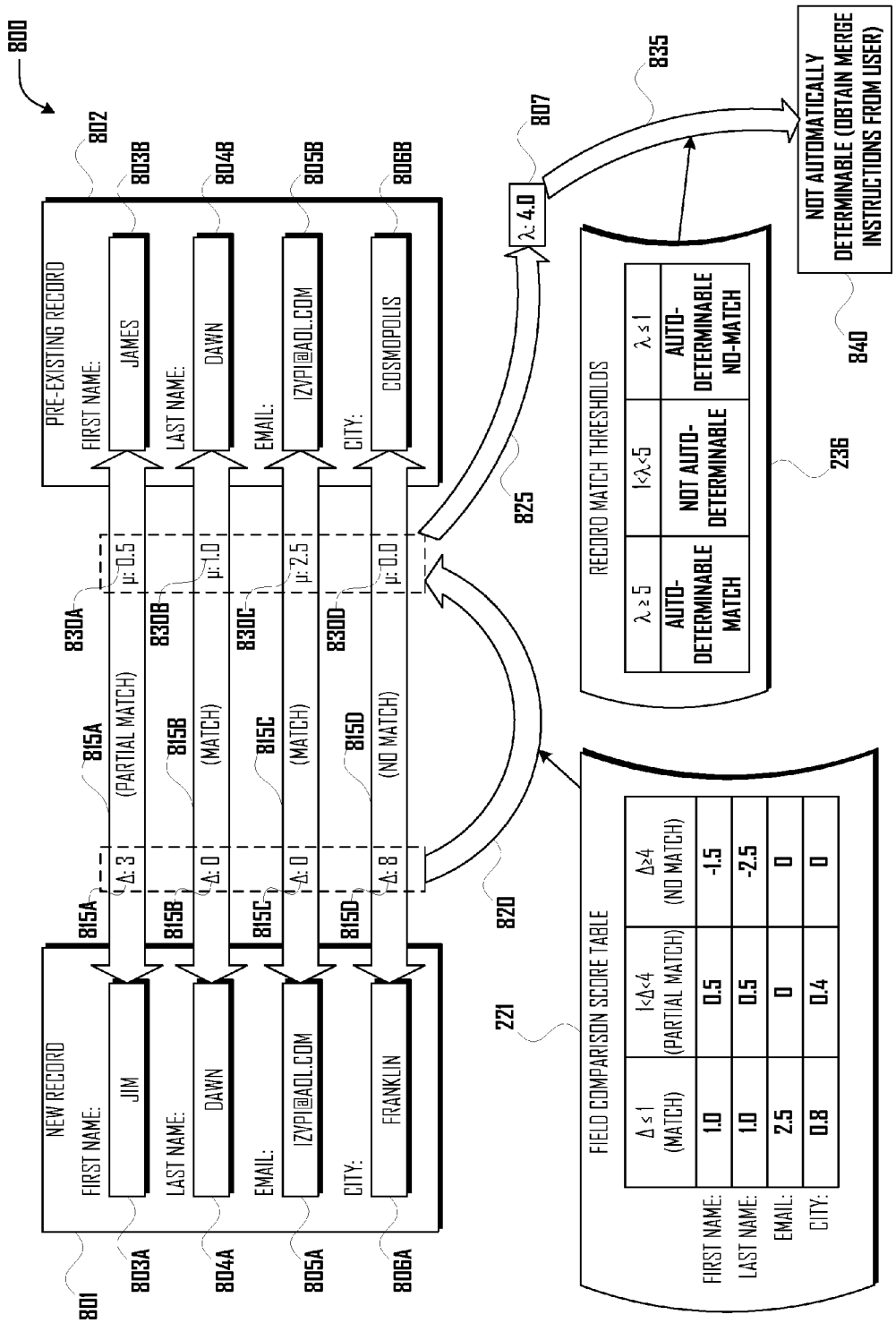
FIG. 8 illustrates an exemplary scenario in which subroutine 700 is applied to determine whether a new record can be automatically determined to be a match or a no-match of a preexisting record, in accordance with one embodiment.

FIG. 8 illustrates an exemplary scenario in which subroutine 700 is applied to determine whether a new record 801 can be automatically determined to be a match or a no-match of a preexisting record 802, in accordance with one embodiment.

New record 801 includes exemplary fields 803-806A. Preexisting record 802 includes respectively corresponding fields 803-806B.

Arrows 815A-D represent field comparison operations (see block 715, discussed above). For example, according to comparison operation 815A, new record field 803A is compared with preexisting record field 803B to determine a field comparison value (Δ) 815A of 3. Similarly fields 804A-B, 805A-B, and 806A-B, are compared respectively in operations 815B-D to obtain field comparison values 815B-D of 0, 0, and 8.

Arrow 720 represents operations (see block 720, discussed above) for determining field-scores based on field comparison values 815A-D and field comparison score table 221. According to field comparison score table 221, field comparison values 815A-D are determined to be, respectively, partial match, match, match, and no-match, which correspond to field comparison scores 830A-D.

Arrow 825 represents a record-match score accumulation operation (see block 725, discussed above) by which a record match score (λ) 807 of 4.0 is determined for records 801 and 802.

Arrow 835 represents a decision operation (see block 735, discussed above), by which record match score (λ) 807 is compared to pre-determined record match thresholds 236 to obtain result 840, which indicates whether new record 801 is an automatically determinable match, an automatically determinable no-match, or is not automatically determinable compared to preexisting record 802. As illustrated in FIG. 8, records 801 and 802 are determined to be not automatically determinable.

Figure 9:
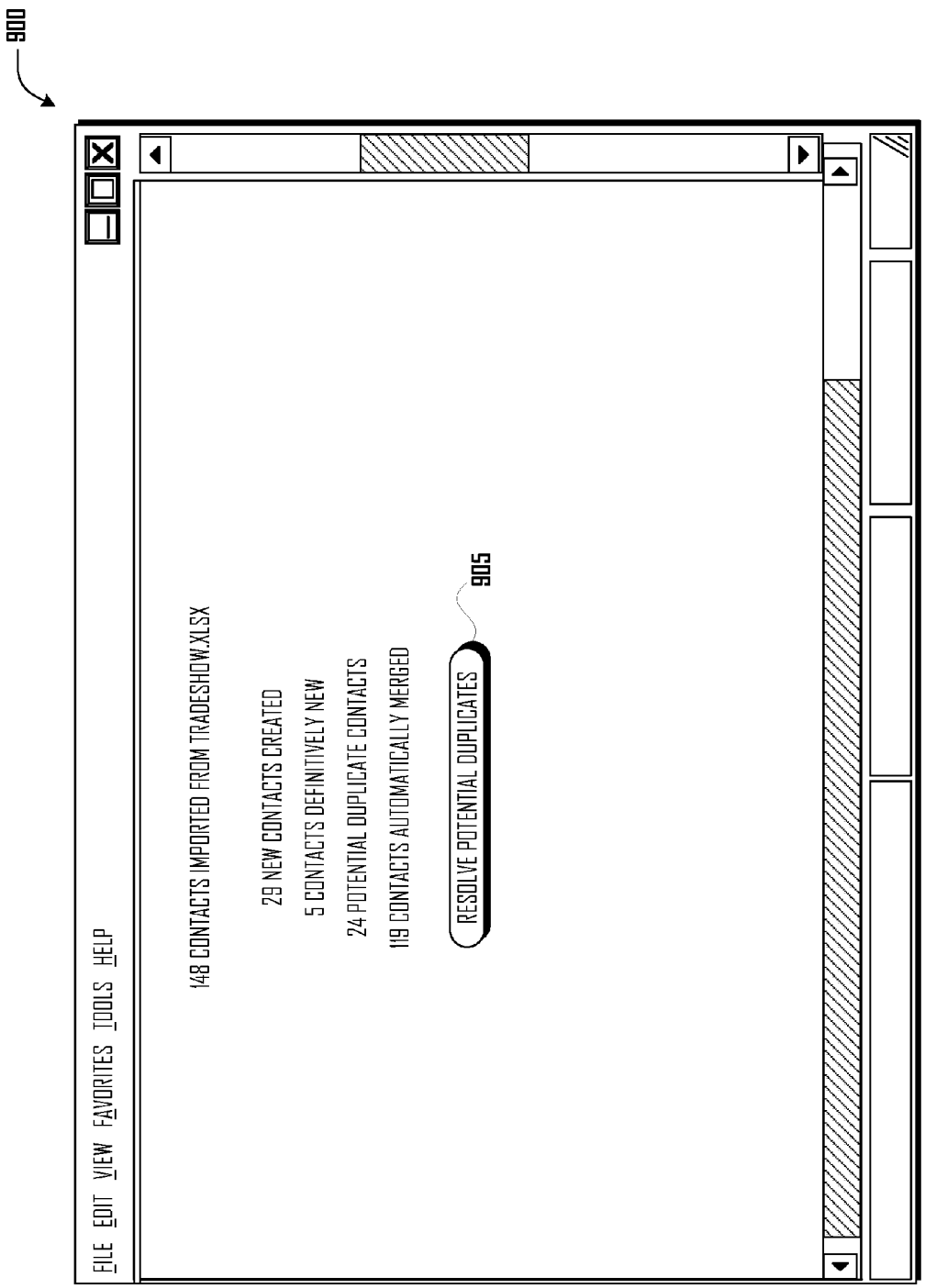
FIG. 9 illustrates a user interface indicating that a number of records have been imported into a healthcare marketing database, in accordance with one embodiment.

FIG. 9 illustrates a user interface 900 indicating that several records have been imported into a healthcare marketing database, in accordance with one embodiment. User interface 900 indicates that a number of records have been identified as potential duplicates. User interface 900 further includes control 905, by which an operator can indicate that he or she wishes to resolve the potential duplicates.

Figure 10:
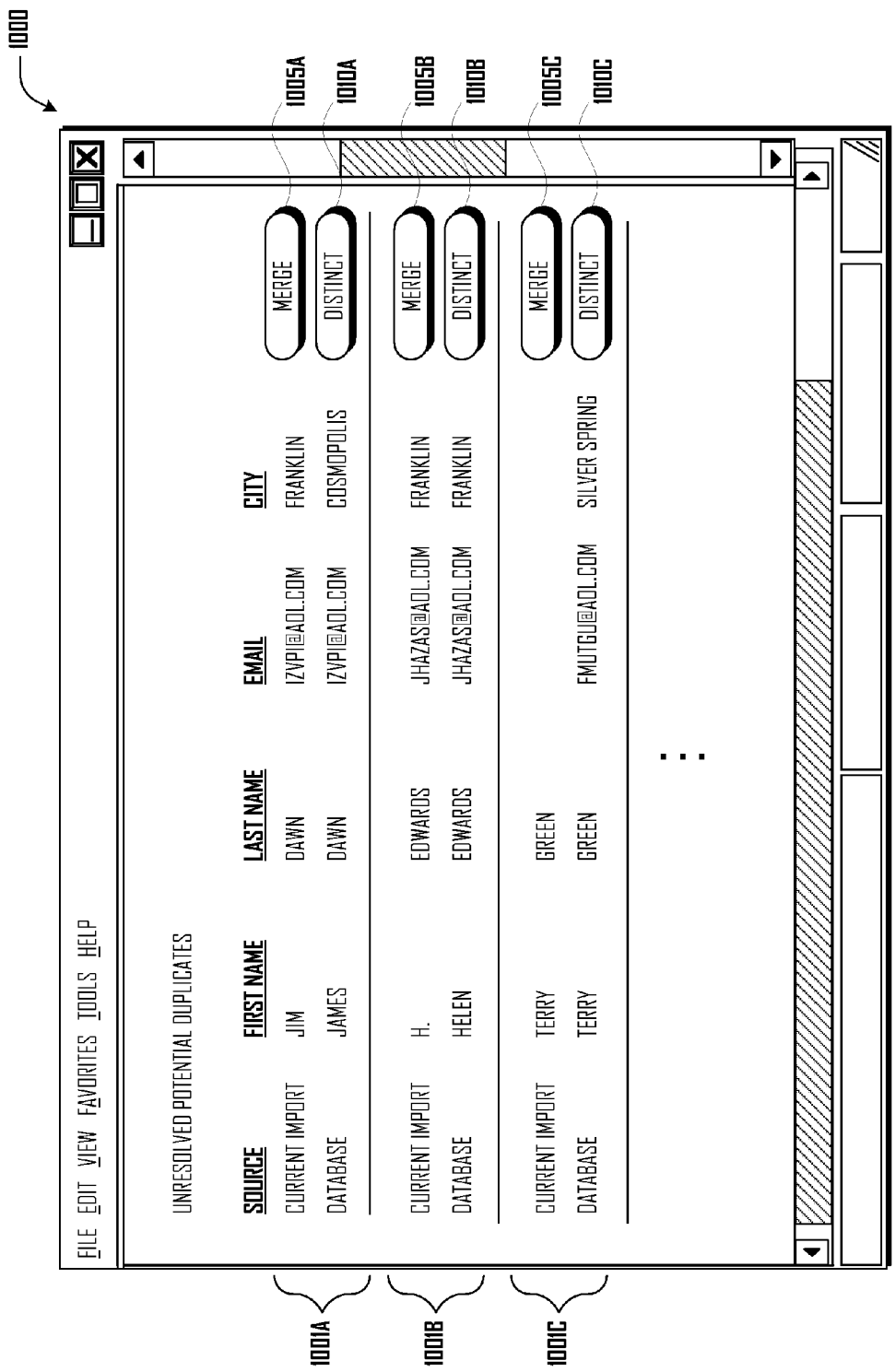
FIG. 10 illustrates a user interface by which a user can resolve one or more potentially duplicate records in a healthcare marketing database, in accordance with one embodiment.

FIG. 10 illustrates a user interface 1000 by which a user can resolve one or more potentially duplicate records in a healthcare marketing database, in accordance with one embodiment. User interface 1000 shows three sets of potential duplicate records, 1001A-C. User interface 1000 includes controls 1005A-C, by which a user can indicate that some or all of the sets 1001A-C of potential duplicates should be merged together. In some embodiments, a further user interface (not shown) may be utilized to allow a user to indicate how specific fields should be combined into a merged record. User interface 1000 also includes controls 1010A-C, by which a user can indicate that one or more potentially duplicate sets 1001A-C should be marked as distinct records.

Although specific embodiments have been illustrated and described herein, a whole variety of alternate and/or equivalent implementations may be substituted for the specific embodiments shown and described without departing from the scope of the present disclosure. This application is intended to cover any adaptations or variations of the embodiments discussed herein.

We claim:

1. A computer-implemented method for importing health care marketing data, the method comprising:
    obtaining, by the computer, a healthcare-marketing-related record comprising data structured according to a plurality of fields of a plurality of field types;
    obtaining, by the computer, a plurality of data validity rules comprising a plurality of field-specific validity rules and at least one field-generic validity rule, each field-specific validity rule indicating data that can be validly included in a particular one of said plurality of field types, the at least one field-generic validity rule indicating data that can be validly included in any of said plurality of field types;
    obtaining, by the computer, a plurality of field-specific data canonicity rules, each canonicity rule indicating a standard form for representing data in a particular one of said plurality of field types;
    cleaning and normalizing, by the computer, said healthcare-marketing-related record according to said plurality of data validity rules and said plurality of field-specific data canonicity rules, respectively; and
    identifying, by the computer, a pre-existing healthcare-marketing-related record in a persistent healthcare-marketing database that is potentially duplicative of said cleaned and normalized healthcare-marketing-related record, the persistent healthcare-marketing database comprising a plurality of pre-existing healthcare-marketing-related records; and
    determining, by the computer, whether said healthcare-marketing-related record is an automatically determinable match, an automatically determinable no-match, or a non-automatically-determinable possible-match in comparison with said identified pre-existing healthcare-marketing-related record by:
        obtaining, by the computer, a configurable field-wise scoring table comprising, for each of said plurality of fields, at least three field-specific comparison scores comprising a field-wise match score, a field-wise no-match score, and a field-wise possible-match score;
        determining a plurality of field-wise comparison values corresponding to said healthcare-marketing-related record and said identified pre-existing healthcare-marketing-related record;
        determining whether each of the plurality of field-wise comparison values corresponds to a field-wise match, a field-wise no-match, or a field-wise possible-match based on a comparison of each field-wise comparison value to one or more field-level thresholds;
        determining a plurality of field-wise comparison scores according to said field-wise scoring table and whether each of the plurality of field-wise comparison values corresponds to a field-wise match, a field-wise no-match, or a field-wise possible-match;
        determining a record-wise match score according to said plurality of field-wise comparison scores; and
        comparing the determined record-wise match score to one or more record-level thresholds.

2. The method of claim 1, wherein cleaning and normalizing said healthcare-marketing-related record comprises, for each field of said first plurality of fields of said healthcare-marketing-related record:
    determining, by the computer, a field type of the current field of said healthcare-marketing-related record;
    selecting, by the computer according to said determined field type of the current field of said healthcare-marketing-related record, at least one of said plurality of data validity rules and at least one of said plurality of field-type-specific data canonicity rules;
    applying, by the computer, the selected at least one of said plurality of data validity rules to the data corresponding to the current field of said healthcare-marketing-related record to obtain valid data corresponding to the current field of said healthcare-marketing-related record; and
    applying, by the computer, the selected at least one of said plurality of data canonicity rules to said valid data to determine canonical data corresponding to the current field of said healthcare-marketing-related record.

3. The method of claim 1, further comprising:
    when said healthcare-marketing-related record is determined to be an automatically determinable match, automatically merging, by the computer, said healthcare-marketing-related record into said identified pre-existing healthcare-marketing-related record in said healthcare-marketing database;
    when said healthcare-marketing-related record is determined to be an automatically determinable no-match, indicating, by the computer, said healthcare-marketing-related record as distinct from said identified pre-existing healthcare-marketing-related record in said healthcare-marketing database; and
    when said healthcare-marketing-related record is determined to be a non-automatically-determinable possible-match, obtaining, by the computer, user-input indicating whether to merge said healthcare-marketing-related record into said identified pre-existing healthcare-marketing-related record in said healthcare-marketing database.

4. The method of claim 1, wherein determining whether said healthcare-marketing-related record is an automatically determinable match, an automatically determinable no-match, or a non-automatically-determinable possible-match further comprises:
    comparing said record-wise match score with a pre-determined record match threshold and a pre-determined record no-match threshold.

5. A non-transient computer-readable medium having stored thereon instructions that, when executed by a processor, configure the processor to perform a method for importing health care marketing data, the method comprising:
    obtaining a healthcare-marketing-related record comprising data structured according to a plurality of fields of a plurality of field types;
    obtaining a plurality of data validity rules comprising a plurality of field-specific validity rules and at least one field-generic validity rule, each field-specific validity rule indicating data that can be validly included in a particular one of said plurality of field types, the at least one field-generic validity rule indicating data that can be validly included in any of said plurality of field types;

obtaining a plurality of field-specific data canonicity rules, each canonicity rule indicating a standard form for representing data in a particular one of said plurality of field types;

cleaning and normalizing said healthcare-marketing-related record according to said plurality of data validity rules and said plurality of field-specific data canonicity rules, respectively; and identifying, by the computer, a pre-existing healthcare-marketing-related record in a persistent healthcare-marketing database that is potentially duplicative of said cleaned and normalized healthcare-marketing-related record, the persistent healthcare-marketing database comprising a plurality of pre-existing healthcare-marketing-related records; and determining, by the computer, whether said healthcare-marketing-related record is an automatically determinable match, an automatically determinable no-match, or a non-automatically-determinable possible-match in comparison with said identified pre-existing healthcare-marketing-related record by:

obtaining, by the computer, a configurable field-wise scoring table comprising, for each of said plurality of fields, at least three field-specific comparison scores comprising a field-wise match score, a field-wise no-match score, and a field-wise possible-match score;

determining a plurality of field-wise comparison values corresponding to said healthcare-marketing-related record and said identified pre-existing healthcare-marketing-related record;

determining whether each of the plurality of field-wise comparison values corresponds to a field-wise match, a field-wise no-match, or a field-wise possible-match based on a comparison of each field-wise comparison value to one or more field-level thresholds;

determining a plurality of field-wise comparison scores according to said field-wise scoring table and whether each of the plurality of field-wise comparison values corresponds to a field-wise match, a field-wise no-match, or a field-wise possible-match;

determining a record-wise match score according to said plurality of field-wise comparison scores; and comparing the determined record-wise match score to one or more record-level thresholds.

6. The computer-readable medium of claim 5, wherein cleaning and normalizing said healthcare-marketing-related record comprises, for each field of said first plurality of fields of said healthcare-marketing-related record:

determining a field type of the current field of said healthcare-marketing-related record;

selecting, according to said determined field type of the current field of said healthcare-marketing-related record, at least one of said plurality of data validity rules and at least one of said plurality of field-type-specific data canonicity rules;

applying the selected at least one of said plurality of data validity rules to the data corresponding to the current field of said healthcare-marketing-related record to obtain valid data corresponding to the current field of said healthcare-marketing-related record; and applying the selected at least one of said plurality of data canonicity rules to said valid data to determine canonical data corresponding to the current field of said healthcare-marketing-related record.

7. The computer-readable medium of claim 5, further comprising:

when said healthcare-marketing-related record is determined to be an automatically determinable match, automatically merging said healthcare-marketing-related record into said identified pre-existing healthcare-marketing-related record in said healthcare-marketing database;

when said healthcare-marketing-related record is determined to be an automatically determinable no-match, indicating said healthcare-marketing-related record as distinct from said identified pre-existing healthcare-marketing-related record in said healthcare-marketing database; and when said healthcare-marketing-related record is determined to be a non-automatically-determinable possible-match, obtaining user-input indicating whether to merge said healthcare-marketing-related record into said identified pre-existing healthcare-marketing-related record in said healthcare-marketing database.

8. The computer-readable medium of claim 5, wherein determining whether said healthcare-marketing-related record is an automatically determinable match, an automatically determinable no-match, or a non-automatically-determinable possible-match further comprises:

comparing said record-wise match score with a pre-determined record match threshold and a pre-determined record no-match threshold.

9. A computing apparatus comprising a processor and a memory having stored thereon instructions that, when executed by the processor, configure the apparatus to perform a method for importing health care marketing data, the method comprising:

obtaining a healthcare-marketing-related record comprising data structured according to a plurality of fields of a plurality of field types;

obtaining a plurality of data validity rules comprising a plurality of field-specific validity rules and at least one field-generic validity rule, each field-specific validity rule indicating data that can be validly included in a particular one of said plurality of field types, the at least one field-generic validity rule indicating data that can be validly included in any of said plurality of field types;

obtaining a plurality of field-specific data canonicity rules, each canonicity rule indicating a standard form for representing data in a particular one of said plurality of field types;

cleaning and normalizing said healthcare-marketing-related record according to said plurality of data validity rules and said plurality of field-specific data canonicity rules, respectively; and identifying, by the computer, a pre-existing healthcare-marketing-related record in a persistent healthcare-marketing database that is potentially duplicative of said cleaned and normalized healthcare-marketing-related record, the persistent healthcare-marketing database comprising a plurality of pre-existing healthcare-marketing-related records; and determining, by the computer, whether said healthcare-marketing-related record is an automatically determinable match, an automatically determinable no-match, or a non-automatically-determinable possible-match in comparison with said identified pre-existing healthcare-marketing-related record by:

obtaining, by the computer, a configurable field-wise scoring table comprising, for each of said plurality of fields, at least three field-specific comparison scores comprising a field-wise match score, a field-wise no-match score, and a field-wise possible-match score;
determining a plurality of field-wise comparison values corresponding to said healthcare-marketing-related record and said identified pre-existing healthcare-marketing-related record;
determining whether each of the plurality of field-wise comparison values corresponds to a field-wise match, a field-wise no-match, or a field-wise possible-match based on a comparison of each field-wise comparison value to one or more field-level thresholds;
determining a plurality of field-wise comparison scores according to said field-wise scoring table and whether each of the plurality of field-wise comparison values corresponds to a field-wise match, a field-wise no-match, or a field-wise possible-match;
determining a record-wise match score according to said plurality of field-wise comparison scores; and
comparing the determined record-wise match score to one or more record-level thresholds.

10. The apparatus of claim 9, wherein cleaning and normalizing said healthcare-marketing-related record comprises, for each field of said first plurality of fields of said healthcare-marketing-related record:
determining a field type of the current field of said healthcare-marketing-related record;
selecting, according to said determined field type of the current field of said healthcare-marketing-related record, at least one of said plurality of data validity rules and at least one of said plurality of field-type-specific data canonicity rules;
applying the selected at least one of said plurality of data validity rules to the data corresponding to the current field of said healthcare-marketing-related record to obtain valid data corresponding to the current field of said healthcare-marketing-related record; and
applying the selected at least one of said plurality of data canonicity rules to said valid data to determine canonical data corresponding to the current field of said healthcare-marketing-related record.

11. The apparatus of claim 9, further comprising:
when said healthcare-marketing-related record is determined to be an automatically determinable match, automatically merging said healthcare-marketing-related record into said identified pre-existing healthcare-marketing-related record in said healthcare-marketing database;
when said healthcare-marketing-related record is determined to be an automatically determinable no-match, indicating said healthcare-marketing-related record as distinct from said identified pre-existing healthcare-marketing-related record in said healthcare-marketing database; and
when said healthcare-marketing-related record is determined to be a non-automatically-determinable possible-match, obtaining user-input indicating whether to merge said healthcare-marketing-related record into said identified pre-existing healthcare-marketing-related record in said healthcare-marketing database.

12. The apparatus of claim 9, wherein determining whether said healthcare-marketing-related record is an automatically determinable match, an automatically determinable no-match, or a non-automatically-determinable possible-match further comprises:
comparing said record-wise match score with a pre-determined record match threshold and a pre-determined record no-match threshold.

* * * * *